(12) United States Patent
Wu et al.

(10) Patent No.: US 12,509,573 B2
(45) Date of Patent: Dec. 30, 2025

(54) FUNCTIONALIZED GRAPHENE OXIDE NITRILE RUBBER AND TOOTH-SCAR-FREE TOOTH BLOCK

(71) Applicant: Jianhu Kaitai Petroleum Machinery Co.,Ltd., Yancheng (CN)

(72) Inventors: Lizhong Wu, Yancheng (CN); Dongfeng Li, Yancheng (CN)

(73) Assignee: Jianhu Kaitai Petroleum Machinery Co., Ltd., Yancheng (CN)

( * ) Notice: Subject to any disclaimer, the term of this patent is extended or adjusted under 35 U.S.C. 154(b) by 772 days.

(21) Appl. No.: 17/757,525

(22) PCT Filed: Mar. 24, 2021

(86) PCT No.: PCT/CN2021/082676
§ 371 (c)(1),
(2) Date: Jun. 16, 2022

(87) PCT Pub. No.: WO2022/037061
PCT Pub. Date: Feb. 24, 2022

(65) Prior Publication Data
US 2023/0002593 A1 Jan. 5, 2023

(30) Foreign Application Priority Data
Aug. 19, 2020 (CN) .......................... 202010837561.2

(51) Int. Cl.
*C08L 9/02* (2006.01)

(52) U.S. Cl.
CPC ........... *C08L 9/02* (2013.01); *C08L 2205/025* (2013.01); *C08L 2310/00* (2013.01)

(58) Field of Classification Search
CPC .. C08L 9/02; C08L 2205/025; C08L 2310/00; C08K 5/544; C08K 3/04; C08K 3/042; C08K 3/06; C08K 3/22; C08K 5/09; C08K 5/12; C08K 5/136; C08K 5/18; C08K 5/523; C08K 9/06; C08K 2003/2296; C08K 2201/014; C08J 2309/02; C08J 2409/02; C08J 3/226; E21B 19/16
See application file for complete search history.

(56) References Cited

U.S. PATENT DOCUMENTS

| | | | | |
|---|---|---|---|---|
| 5,069,297 A | * | 12/1991 | Krueger | E21B 17/1064 175/325.6 |
| 5,362,787 A | * | 11/1994 | Ngoc | C08L 9/02 524/297 |
| 2014/0087977 A1 | | 3/2014 | Kim et al. | |
| 2015/0197660 A1 | * | 7/2015 | Ronne | C08F 2/44 524/430 |

FOREIGN PATENT DOCUMENTS

| | | | | |
|---|---|---|---|---|
| CN | 101558455 A | | 10/2009 | |
| CN | 102731837 A | * | 10/2012 | |
| CN | 105097066 A | | 11/2015 | |
| CN | 106750664 B | * | 5/2018 | |
| CN | 110343299 A | * | 10/2019 | ......... C08L 9/02 |
| CN | 110483861 A | | 11/2019 | |
| CN | 112029163 A | * | 12/2020 | ......... C08J 3/226 |
| CN | 118834450 A | * | 10/2024 | |
| WO | WO-2010016976 A1 | * | 2/2010 | ......... B60C 1/0008 |

OTHER PUBLICATIONS

Xiang, "Anticorrosive epoxy coatings from direct epoxidation of bioethanol fractionated lignin," 2022, International Journal of Biological Macromolecules, 221, pp. 268-277. (Year: 2022).*

* cited by examiner

*Primary Examiner* — Robert S Jones, Jr.
*Assistant Examiner* — Joshua Caleb Bledsoe
(74) *Attorney, Agent, or Firm* — Sisson & Banyas, Attorneys at Law, LLC; Jeffrey J. Banyas

(57) ABSTRACT

A functionalized graphene oxide nitrile rubber and A tooth-scar-free tooth block is provided. The functionalized graphene oxide nitrile rubber comprises the following components in parts by weight: 100-140 parts of nitrile rubber, 30-90 parts of a functionalized graphene oxide nitrile rubber masterbatch, 1.8-2.52 parts of a vulcanizing agent, 1.2-1.68 parts of a vulcanization accelerator, 5-7 parts of a vulcanization activator, 17-23.8 parts of a plasticizer, 2-2.8 parts of antioxidant, 59-86.6 parts of a filler, 0.1-0.14 parts of a curing agent, and 2-2.8 parts of dichlorophenol. The functionalized graphene oxide nitrile rubber above has excellent mechanical properties, a wide applicable temperature range and strong stability in use, and can be prepared into a tooth-scar-free tooth block.

2 Claims, 2 Drawing Sheets

FUNCTIONALIZED GRAPHENE OXIDE NITRILE RUBBER AND TOOTH-SCAR-FREE TOOTH BLOCK

The present disclosure claims the priority from the International Application No. PCT/CN2021/082676, filed to the WIPO on Mar. 24, 2021, titled "Functionalized Graphene Oxide Nitrile Rubber and Indentation-Free Tooth Block" and the Chinese Patent Application No. 202010837561.2, filed to the CNIPA on Aug. 19, 2020, titled "Functionalized Graphene Oxide Nitrile Rubber And Method for Preparing Tooth-Scar-Free Tooth Block", each of which is incorporated herein by reference in its entirety.

TECHNICAL FIELD

The present disclosure relates to a functionalized graphene oxide nitrile rubber and a method for preparing a tooth-scar-free tooth block, which can be used to manufacture hydraulic tongs for down-hole oil and gas production.

BACKGROUND

At present, the primary problem faced by the improvement of safety and comprehensive benefits of the oil and gas well drilling is the failure accident of the down-hole drilling tool, and the economical loss caused by the failure of the drilling tool cannot be underestimated. According to the statistics, about 80% of drilling tool failure accidents are caused by the failure of joints and threads of the drilling tool. Through a large number of failure analysis and research, it is found that most of the failures of drilling tools are due to the wear of joints and threads of the drilling tools, which reduces the torsional strength of the connections and fails under the action of alternating bending stress. Due to the limited length of the joint of the drill pipe, the main tongs clamp the pipe body to buckle and unbuckle, the buckle torque is large, and the tooth scars of the main tongs will become larger. Among the various surface scars on the drill pipe, the tooth scars of the main tongs are the most common and serious, which can easily form stress concentration points and induce the failure of joints and threads of the drilling tools. Therefore, it is a problem that cannot be ignored to reduce the tooth scars damage on the drill pipe body caused by the tongs.

Nitrile rubber is widely used in the manufacture of oil-resistant products such as sealing articles, gaskets and the like due to the excellent oil resistance. However, the using temperature range of nitrile rubber is limited, which cannot meet the on-site working conditions of the protective tooth blocks in drilling tongs. The high temperature environment will reduce the aging resistance of nitrile rubber, thus declining its mechanical properties rapidly. Therefore, the preparation of a nitrile rubber with better mechanical properties is of great significance in practical Applications.

Chinese Patent CN110343299A discloses a graphene-modified nitrile rubber and a preparation method thereof. The method utilizes the product obtained by the dehydration condensation reaction of hydrolyzed mercaptosiloxane and graphene oxide to modify the nitrile rubber, which has more improved mechanical properties than the unmodified nitrile rubber. However, this method does not consider the interfacial compatibility between the filler and the rubber, and the dispersion of the filler in the rubber, so does not have applicability and versatility. And the filler can only be carbon black, that will increase the using amount of the modified graphene oxide and is not economical.

Chinese Patent CN104262700A discloses a preparation method of silica-grafted graphene oxide/rubber composite material. The method utilizes silica-grafted graphene oxide to modify rubber, which has improved heat resistance and wear resistance than unmodified rubber. However, this method does not take into account that the silica has acid radical residues, and after being used for modification, the material is prone to yellowing and poor weather resistance.

Therefore, the nitrile rubber in the related art may suffer from reduced mechanical properties and compatibility problems at the interface between filler and rubber due to the limited temperature range.

SUMMARY

The purpose of the present disclosure relates to a functionalized graphene oxide nitrile rubber and a preparation method of a tooth-scar-free tooth block, wherein the functionalized graphene oxide nitrile rubber has excellent mechanical properties, a wide range of applicable temperatures and strong stability. The problems of poor mechanical properties and interfacial compatibility between the fillers and the rubber caused by the limited using temperature range of nitrile rubber in the related art are well solved. The method for preparing a tooth-scar-free tooth block by using the functionalized graphene oxide nitrile rubber of the present disclosure has the advantages of simple process, low cost, and the manufactured tooth-scar-free tooth block has excellent mechanical properties and strong stability.

The present disclosure relates to a functionalized graphene oxide nitrile rubber, comprising the following components in parts by weight: 100-140 parts of nitrile rubber, 30-90 parts of functionalized graphene oxide nitrile rubber masterbatch, 1.8-2.52 parts of vulcanizing agent, 1.2-1.68 parts of vulcanization accelerator, 5-7 parts of vulcanization activator, 17-23.8 parts of plasticizer, 2-2.8 parts of antioxidant, 59-86.6 parts of filler, 0.1-0.14 part of curing agent and 2-2.8 parts of dichlorophenol (DCP).

Wherein, the plasticizer may be a mixture of stearic acid, dibutyl phthalate and tricresyl phosphate with a mass ratio of 1.5-2.5:8-12:4-6; the antioxidant may be a mixture of N-phenyl-2-naphthylamine (Antioxidant D) and N-cyclohexyl-N'-phenyl-p-phenylenediamine (Antioxidant 4010) with a mass ratio of 1:1; the filler can be a mixture of air-mixed carbon black, semi-reinforced furnace black and an epoxy resin having an average epoxy value of 44/100 (Epoxy Resin E44), with a mass ratio of 32-37:18-22:3-5; the filler can be a mixture of air-mixed carbon black, semi-reinforced furnace black and Epoxy Resin E44 with a mass ratio of 32-37:18-22:3-5; the mass fraction of the functionalized graphene oxide in the functionalized graphene oxide nitrile rubber masterbatch is 30-57%.

The present disclosure further relates to a functionalized graphene oxide modified tooth-scar-free tooth block, which is made of the functionalized graphene oxide nitrile rubber as described above, and the preparation process comprises the following steps:

(1) weighing the components according to the formula of the functionalized graphene oxide nitrile rubber as described above for later use;

(2) plasticating nitrile rubber to obtain a plasticated rubber;

(3) sequentially adding dichlorophenol, a vulcanizing agent, a vulcanization activator, a plasticizer, an antioxidant and a filler into the plasticated rubber obtained in step (2), and uniformly mixing to obtain a premixed rubber compound;

(4) cooling the premixed rubber compound obtained in step (3), then adding a functionalized graphene oxide nitrile rubber masterbatch and a curing agent, uniformly mixing to obtain a mixed rubber compound;

(5) cooling the mixed rubber compound obtained in step (4), then adding a vulcanization accelerator and uniformly mixing, obtaining a mixed rubber sheet;

(6) blanking the mixed rubber sheet obtained in step (5) according to the size and shape of the tooth block mold, wherein the pressing force of the mold in the vulcanization process is 25-27 MPa, the temperature is maintained at 175-180° C., and the pressing time is 5-6 h; after completing the vulcanization, opening the mold and taking out the tooth block;

(7) after taking out the tooth block, trimming and shaping in time.

The method for preparing the tooth-scar-free tooth block provided by the present disclosure is simple in process and low in cost. By adding the functionalized graphene oxide and the epoxy resin in the formula, the prepared functionalized graphene oxide modified nitrile rubber tooth block has excellent mechanical properties, a wide range of applicable temperatures and strong stability, and solves the problem of poor mechanical properties due to the limited using temperature range and interface compatibility between the filler and the rubber of the nitrile rubber in the related art.

DETAILED DESCRIPTION

Figure 1:
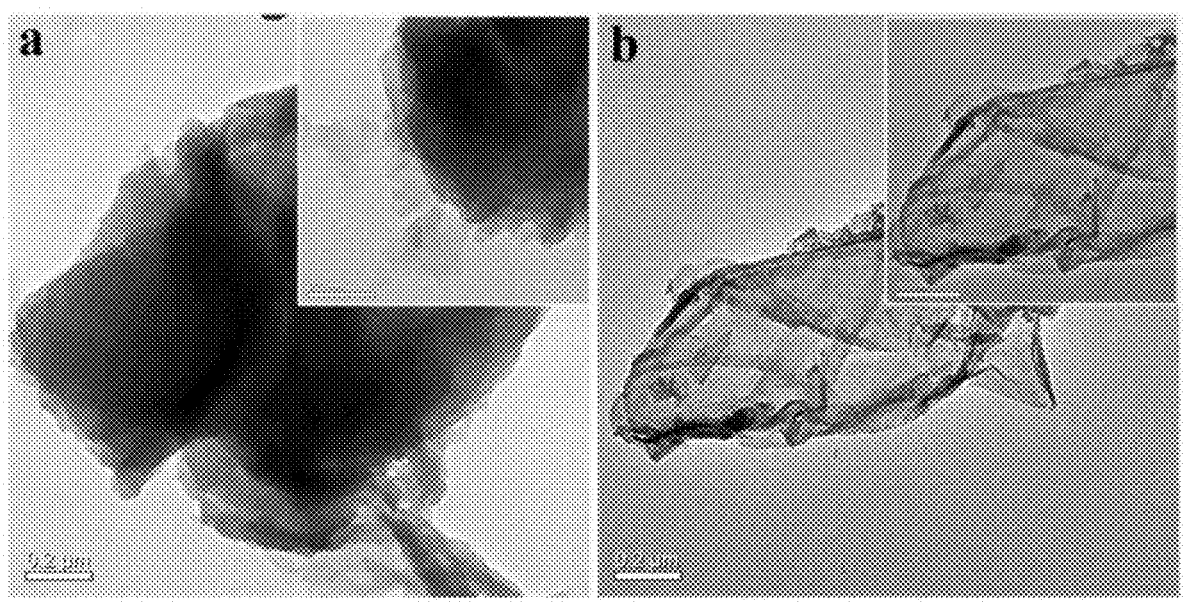
FIG. 1 is a transmission electron microscope image of graphene oxide and functionalized graphene oxide.

A first aspect of the present disclosure provides a functionalized graphene oxide nitrile rubber, comprising the following components in parts by weight: 100-140 parts of nitrile rubber, 30-90 parts of functionalized graphene oxide nitrile rubber masterbatch, 1.8-2.52 parts of vulcanizing agent, 1.2-1.68 parts of vulcanization accelerator, 5-7 parts of vulcanization activator, 17-23.8 parts of plasticizer, 2-2.8 parts of antioxidant, 59-86.6 parts of filler, 0.1-0.14 part of curing agent and 2-2.8 parts of dichlorophenol (DCP).

Wherein, the mass fraction of functionalized graphene oxide in the functionalized graphene oxide nitrile rubber masterbatch may be 30-57%; the vulcanizing agent may be sulfur; the vulcanization accelerator may be 2, 2'-dibenzothiazoledisulfide (Accelerator DM); the vulcanization activator may be zinc oxide; the plasticizer may be a mixture of stearic acid, dibutyl phthalate and tricresyl phosphate with a mass ratio of 1.5-2.5:8-12:4-6, preferably 2:10:5; the antioxidant may be a mixture of Antioxidant D and Antioxidant 4010 with a mass ratio of 1:1; the filler may be a mixture of gas-mixture carbon black, semi-reinforcing furnace black and Epoxy Resin E44, the mass ratio thereof may be 32-37:18-22:3-5, the preferred mass ratio is 35:20:4; and the curing agent may be maleic anhydride.

When the functionalized graphene oxide is uniformly dispersed in the nitrile rubber system, the motion capability of the molecular chain in the nitrile rubber is largely limited by the sheet-like functionalized graphene oxide having a large specific surface area, so that the nitrile rubber exhibits a higher using temperature range. Moreover, the intrinsic strength of the graphene reaches 130 GPa, the fracture strain is about 25%, and the elastic modulus can reach 1.1 TPa. The tensile strength of the graphene can be up to 42 $N/m^2$, which is about 100 times that of the ordinary steel calculated by the two-dimensional strength limit theory. The experimental results show that the mechanical properties of the tooth blocks made of functionalized graphene oxide modified nitrile rubber have been significantly improved. During high temperature vulcanization, the epoxy resin and the curing agent undergo in-situ polymerization in the rubber compound to form nanoscale particles or fibers, or to form a local interpenetrating network structure with the rubber molecules, and the comprehensive performance of the rubber compound is improved. The epoxy resin as an interface additive between the non-polar unsaturated rubber, the filler and the graphene oxide, forms a bridge function at the interface between the filler and the rubber, and the dispersion degree and the reinforcing effect of the filler are improved.

The preparation method of the functionalized graphene oxide nitrile rubber masterbatch comprises the following steps: dispersing the functionalized graphene oxide in a dispersant, ultrasonically dispersing for 60-90 minutes to obtain a functionalized graphene oxide dispersion, adding nitrile rubber latex and stirring for 90-120 min to obtain a mixed solution, wherein the mass of the functionalized graphene oxide accounts for 11-18% of the mass of the functionalized graphene oxide nitrile rubber masterbatch. The mixed solution above is added to a mixed liquid of a calcium chloride aqueous solution and ethanol with a volume ratio of 1:2-4 used as a coagulation solution for demulsification, wherein the volume ratio of the mixed solution to the coagulation solution is 2-3:3-5, after suction filtration, washing and drying, a functionalized graphene oxide nitrile rubber masterbatch is obtained.

The dispersant can be a mixture of xylene, n-butanol, cyclohexanone, 1,4 butanediol diglycidyl ether, and the mass ratio thereof may be 6-8:1-3:0.5-1.5:2-4, the preferred mass ratio is 7:2:1:3. The solid content of the nitrile rubber latex may be 45-46%.

The preparation method of the above-described functionalized graphene oxide may be preparing graphene oxide (GO) by a modified Hummers method; adding the GO and 3-Aminopropyltrimethoxysilane (APTMS) as a modifier with a mass ratio of 1:2 into an anhydrous ethanol and ultrasonic stirring uniformly; heating to 70-80° C. in a water bath and refluxing for 4-6 hours; then adding distilled water to the mixture, centrifuging, washing and drying to obtain Aminated Graphene (APTMS-GO), the lamellar spacing of which may be 0.78 nm. In the above-described preparation method of functionalized graphene oxide, in the mixture of GO, APTMS and anhydrous ethanol, the mass content of anhydrous ethanol can be 94%. Wherein, the drying temperature is 60-80° C., and the drying time is 8-12 h.

After graphene oxide is functionalized, the lamellar spacing of the graphene becomes larger, which can better bound the movement of rubber molecular chains and epoxy resin molecular chains, so that the tooth block made of rubber modified by functionalized graphene oxide can have a wider using temperature range; and the functionalized graphene oxide is easier to uniformly disperse in the rubber matrix due to the presence of more active functional groups on the surface of the functionalized graphene oxide. Due to the good dispersion performance, the defects in the rubber are reduced, so that the modified rubber has better mechanical properties.

A second aspect of the present disclosure relates to a tooth-scar-free tooth block made of functionalized graphene oxide nitrile rubber, which is made of the functionalized graphene oxide nitrile rubber as described above, and the preparation process comprises the following steps:
  (1) weighing the components according to the formula of the functionalized graphene oxide nitrile rubber as described above for later use;
  (2) plasticating nitrile rubber to obtain a plasticated rubber;
  (3) sequentially adding dichlorophenol, a vulcanizing agent, a vulcanization activator, a plasticizer, an antioxidant and a filler into the plasticated rubber obtained in step (2), and uniformly mixing to obtain a premixed rubber compound;
  (4) cooling the premixed rubber compound obtained in step (3), then adding a functionalized graphene oxide nitrile rubber masterbatch, a curing agent and uniformly mixing to obtain a mixed rubber compound;
  (5) cooling the mixed rubber compound obtained in step (4), then adding a vulcanization accelerator and uniformly mixing, obtaining a mixed rubber sheet;
  (6) blanking the mixed rubber sheet obtained in step (5) according to the size and shape of the tooth block mold, wherein the pressing force of the mold in the vulcanization process is 25-27 MPa, the temperature is maintained at 175-180° C., and the pressing time is 5-6 h; after completing the vulcanization, opening the mold and taking out the tooth block;
  (7) after taking out the tooth block, trimming and shaping in time.

The present disclosure will be further described in detail below with reference to specific examples.

Example 1

A functionalized graphene oxide modified tooth-scar-free tooth block, using functionalized graphene oxide nitrile rubber as the raw material, comprising the following components in parts by weight:
100 parts of nitrile rubber, 30 parts of functionalized graphene oxide nitrile rubber masterbatch, 1.8 parts of vulcanizing agent, 1.2 parts of vulcanization accelerator, 5 parts of vulcanization activator, 17 parts of plasticizer, 2 parts of antioxidant, 59 parts of filler, 0.1 part of curing agent and 2 parts of dichlorophenol (DCP).

Wherein, the vulcanizing agent is sulfur; the vulcanization accelerator is Accelerator DM; the vulcanization activator is zinc oxide; the plasticizer is stearic acid, dibutyl phthalate and tricresyl phosphate with a mass ratio of 2:10:5; the antioxidant is a mixture of Antioxidant D and Antioxidant 4010 with a mass ratio of 1:1; the filler is gas-mixture carbon black, semi-reinforcing furnace black and Epoxy Resin E44 with a mass ratio of 35:20:4; and the curing agent can be maleic anhydride.

A method for preparing the functionalized graphene oxide modified tooth-scar-free tooth block as described above, comprising the following steps:
  (1) weighing the components according to the above formula for later use;
  (2) adding nitrile rubber raw rubber to an open mill for plasticization for 15 min to obtain a plasticated rubber;
  (3) adding dichlorophenol, a vulcanizing agent, a vulcanization activator, a plasticizer, an antioxidant and a filler into the obtained plasticated rubber, and uniformly mixing to obtain premixed rubber compound;
  (4) after cooling the premixed rubber compound obtained in step (3), adding a functionalized graphene oxide nitrile rubber masterbatch and a curing agent, and uniformly mixing to obtain a mixed rubber compound; after cooling, adding a vulcanization accelerator, and then obtaining a mixed rubber sheet;
  (5) blanking the mixed rubber sheet obtained in step (4) according to the size and shape of the tooth block mold, wherein the pressing force of the mold in the vulcanization process is 25° C., the temperature is maintained at 175° C., and the pressing time is 5 h; after vulcanization, opening the mold and taking out the tooth block product.

Example 2

A functionalized graphene oxide modified tooth-scar-free tooth block, using a functionalized graphene oxide nitrile rubber as the raw material, the functionalized graphene oxide nitrile rubber comprising the following components in parts by weight:
120 parts of nitrile rubber, 60 parts of functionalized graphene oxide nitrile rubber masterbatch, 2 parts of vulcanizing agent, 1.5 parts of vulcanization accelerator, 6.5 parts of vulcanization activator, 20 parts of plasticizer, 2.5 parts of antioxidant, 70 parts of filler, 0.12 part of curing agent and 2.5 parts of dichlorophenol (DCP).

Wherein, the vulcanizing agent is sulfur; the vulcanization accelerator is Accelerator DM; the vulcanization activator is zinc oxide; the plasticizer is stearic acid, dibutyl phthalate and tricresyl phosphate with a mass ratio of 2:10:5; the antioxidant is a mixture of Antioxidant D and Antioxidant 4010 with a mass ratio of 1:1; the filler is gas-mixture carbon black, semi-reinforcing furnace black and Epoxy Resin E44 with a mass ratio of 35:20:4; and the curing agent can be maleic anhydride.

A method for preparing the functionalized graphene oxide modified tooth scar-free tooth block as described above, comprising the following steps:
  (1) weighing the components according to the above formula for later use;
  (2) adding nitrile rubber raw rubber to an open mill for plasticization for 15 min to obtain a plasticated rubber;
  (3) adding dichlorophenol, a vulcanizing agent, a vulcanization activator, a plasticizer, an antioxidant and a filler into the obtained plasticated rubber, and uniformly mixing to obtain a premixed rubber compound;
  (4) after cooling the premixed rubber compound obtained in step (3), adding a functionalized graphene oxide nitrile rubber masterbatch and a curing agent, and uniformly mixing to obtain a mixed rubber compound; after cooling, adding a vulcanization accelerator, and then obtaining a mixed rubber sheet;
  (5) blanking the mixed rubber sheet obtained in step (4) according to the size and shape of the tooth block mold, wherein the pressing force of the mold in the vulcanization process is 26 MPa, the temperature is maintained at 175° C., and the pressing time is 5 h; after vulcanization, opening the mold and taking out the tooth block.

Example 3

A functionalized graphene oxide modified tooth-scar-free tooth block, using functionalized graphene oxide nitrile rubber as the raw material, comprising the following components in parts by weight:
110 parts of nitrile rubber, 50 parts of functionalized graphene oxide nitrile rubber masterbatch, 2.1 parts of vulcanizing agent, 1.4 parts of vulcanization accelerator, 5.5 parts of vulcanization activator, 21 parts of plasticizer, 2.3 parts of antioxidant, 60 parts of filler, 0.12 part of curing agent and 2.3 parts of dichlorophenol (DCP).

Wherein, the vulcanizing agent is sulfur; the vulcanization accelerator is Accelerator DM; the vulcanization activator is zinc oxide; the plasticizer is stearic acid, dibutyl phthalate and tricresyl phosphate with a mass ratio of 2:10:5; the antioxidant is a mixture of Antioxidant D and Antioxidant 4010 with a mass ratio of 1:1; the filler is gas-mixture carbon black, semi-reinforcing furnace black and Epoxy Resin E44 with a mass ratio of 35:20:4; and the curing agent can be maleic anhydride.

A method for preparing the functionalized graphene oxide modified tooth-scar-free tooth block as described above, comprising the following steps:
(1) weighing the components according to the above formula for later use;
(2) adding nitrile rubber raw rubber to an open mill for plasticization for 15 min to obtain a plasticated rubber;
(3) adding dichlorophenol, a vulcanizing agent, a vulcanization activator, a plasticizer, an antioxidant and a filler into the obtained plasticated rubber, and uniformly mixing to obtain a premixed rubber compound;
(4) after cooling the premixed rubber compound obtained in step (3), adding a functionalized graphene oxide nitrile rubber masterbatch and a curing agent, and uniformly mixing to obtain a mixed rubber compound; after cooling, adding a vulcanization accelerator, and then obtaining a mixed rubber sheet;
(5) blanking the mixed rubber sheet obtained in step (4) according to the size and shape of the tooth block mold, wherein the pressing force of the mold in the vulcanization process is 26 MPa, the temperature is maintained at 180° C., and the pressing time is 5.5 hours; after vulcanization, opening the mold and taking out the tooth block.

Comparative Example 1

A graphene modified nitrile rubber, comprising the following components in parts by weight:

85 parts of nitrile rubber, 15 parts of modified graphene oxide carboxyl nitrile rubber masterbatch, 1.7 parts of vulcanizing agent, 2 parts of vulcanization accelerator, 3 parts of vulcanization activator, 3 parts of plasticizer, 1.5 parts of antioxidant and 30 parts of filler.

Wherein, the nitrile rubber is carboxyl nitrile rubber, the content of bound acrylonitrile in the carboxyl nitrile rubber is 33-40%, the content of carboxyl is 3-5%; the modified graphene oxide carboxyl nitrile rubber masterbatch is modified graphene oxide carboxyl nitrile rubber masterbatch II; the vulcanizing agent is benzoyl peroxide, the vulcanization accelerator is 1.2 parts of N-oxodiethylidene-2-benzothiazole subsulfonamide and 0.8 parts of zinc diethyldithiocarbamate; the vulcanization activator is zinc oxide; the plasticizer is dioctyl azelate; the antioxidant is 2,2,4-trimethyl-1.2-dihydroquinoline polymer; and the filler is furnace carbon black with an average particle size of 11-25 nm.

A method for preparing the functionalized graphene oxide modified tooth-scar-free tooth block as described above, comprising the following steps:
S1. weighing the components according to the above formula for later use;
S2. performing segmented plasticization of the nitrile rubber on an open mill, controlling the roller temperature to 35° C., the roller distance to 0.5 mm, the plasticization time to 25 minutes, parking for 4 h between each segment, and repeating the plasticization for three times to obtain a plasticated rubber;
S3. controlling the roller temperature to 35° C., using a 3 mm small roller distance, and alternately adding a vulcanizing agent, a vulcanization activator, a plasticizer, an antioxidant and a filler in the plasticated rubber obtained in step S2, and mixing uniformly to obtain a premixed rubber compound;
S4. after cooling the premixed rubber compound obtained in step S3, adding the modified graphene oxide carboxyl nitrile rubber masterbatch, thinning for 20 times, wrapping the rubber to form a triangular rubber bag for 15 times until uniformly mixed, obtaining a mixed rubber compound;
S5. cooling the mixed rubber compound obtained in step S4, then adding a vulcanization accelerator and uniformly mixing, obtaining a mixed rubber sheet;
S6. parking the mixed rubber sheet obtained in step S5 for 12 h, then placing in a flat vulcanizing instrument, vulcanizing at 155° C. for 90 min to obtain a graphene oxide modified nitrile rubber.

Modified graphene oxide carboxyl nitrile rubber masterbatch II can be prepared from carboxyl nitrile latex and modified graphene oxide. The preparation process is as follows:
(1) adding γ-mercaptopropyltrimethoxysilane and graphene oxide with a mass ratio of 8:1 to a mixed system of ethanol and water with a volume ratio of 3:1, adding hydrochloric acid to adjust the pH to 5 and heating to 95° C.; the hydrolyzed γ-mercaptopropyltrimethoxysilane and graphene oxide undergoing a dehydration condensation reaction and reacting for 9 hours, washing with distilled water to obtain modified graphene oxide;
(2) ultrasounding 5 parts of modified graphene oxide, 200 parts of deionized water and 1.0 part of alkylphenol polyoxyethylene ether for 50 minutes to obtain a modified graphene oxide dispersion, mixing the obtained modified graphene oxide dispersion with 100 parts of carboxyl nitrile latex with a solid content of 46% and stirring for 2 hours until uniformly mixed, then pouring into a mixed liquid of calcium chloride aqueous solution and ethanol solution for demulsification, washing with distilled water for three times and drying to obtain the modified graphene oxide carboxyl nitrile rubber masterbatch II.

It should be noted that, the content of each substance in the above preparation process is only for illustrative use, and the increase or decrease of a fixed ratio on the basis of the above numerical range are all within the protection scope of the present disclosure.

Comparative Example 2

A modified nitrile rubber, comprising the following components in parts by weight:

85 parts of nitrile rubber, 1.7 parts of vulcanizing agent, 2 parts of vulcanization accelerator, 3 parts of vulcanization activator, 3 parts of plasticizer, 1.5 parts of antioxidant and 30 parts of filler.

Wherein, the nitrile rubber is carboxyl nitrile rubber, the content of bound acrylonitrile in the carboxyl nitrile rubber is 33-40%, the content of carboxyl is 3-5%; the modified graphene oxide carboxyl nitrile rubber masterbatch is modified graphene oxide carboxyl nitrile rubber masterbatch II; the vulcanizing agent is benzoyl peroxide, the vulcanization accelerator is 1.2 parts of N-oxodiethylidene-2-benzothiazole subsulfonamide and 0.8 parts of zinc diethyldithiocarbamate; the vulcanization activator is zinc oxide; the plasticizer is dioctyl azelate; the antioxidant is 2,2,4-trimethyl-1.2-dihydroquinoline polymer; and the filler is furnace carbon black with an average particle size of 11-25 nm.

A method for preparing the functionalized graphene oxide modified tooth-scar-free tooth block as described above, comprising the following steps:

S1. weighing the components according to the above formula for later use;

S2. performing segmented plasticization of the nitrile rubber on an open mill, controlling the roller temperature to 35° C., the roller distance to 0.5 mm, the plasticization time to 25 minutes, parking for 4 h between each segment, and repeating the plasticization for three times to obtain a plasticated rubber;

S3. controlling the roller temperature to 35° C., using a 3 mm small roller distance, and alternately adding a vulcanizing agent, a vulcanization activator, a plasticizer, an antioxidant and a filler in the plasticated rubber obtained in step S2, and mixing uniformly to obtain a premixed rubber compound;

S4. after cooling the premixed rubber compound obtained in step S3, thinning for 20 times, wrapping the rubber to form a triangular rubber bag for 15 times until uniformly mixed, obtaining a mixed rubber compound;

S5. cooling the mixed rubber compound obtained in step S4, then adding a vulcanization accelerator and uniformly mixing, obtaining a mixed rubber sheet;

S6. parking the mixed rubber sheet obtained in step S5 for 12 h, then placing in a flat vulcanizing instrument, vulcanizing at 155° C. for 90 min to obtain a modified nitrile rubber.

Comparative Example 3

Preparation of silica-grafted graphene oxide nanoparticles: using flake graphite as raw material, using Hummers oxidation method to prepare graphite oxide, and forming an uniformly dispersed graphene oxide mixed solution with a mass concentration of 0.5 g/ml by 1000 W ultrasonic treatment; adding 50 g of sodium silicate, 200 ml of deionized water to a 250 ml conical flask, dripping 1.0 ml of concentrated hydrochloric acid, and stirring at 50° C. for 24 h; pouring the reaction solution into a 50 ml beaker, adding 100 ml of tetrahydrofuran, and adding 30 g of sodium chloride, stirring uniformly, using a separatory funnel for liquid separation, discarding the lower clear liquid, adding 20 g of anhydrous magnesium sulfate to the upper organic liquid and standing overnight, filtering to obtain silica sol; adding 15 ml of the ultrasonically dispersed graphene oxide mixed solution and placing the same in a high-pressure reactor, adding 30 ml of silica sol, placing the reactor in an 80° C. oven, reacting at a constant temperature for 2 h, filtering and washing, and drying to obtain gray-black powder, which is the silica-grafted modified graphene oxide composite material.

A silica-grafted graphene oxide/rubber composite material, the mass fraction of each component is: 100 parts of ribbed smoked sheet, 50 parts of super wear-resistant carbon black, 4 parts of white carbon black, and 2.5 parts of silica-grafted graphene oxide nanoparticles, 3 parts silane coupling agent, 2 parts heat stabilizer HS-80, 5 parts zinc oxide, 3 parts stearic acid, 2 parts antioxidant 4020, 1 part antioxidant RD, 2 parts protective wax, 2 parts of insoluble sulfur IS-60, 1 part of accelerator NOBS, and 1 part of accelerator DZ, which are uniformly mixed in an internal mixer to prepare a silica-grafted graphene oxide/rubber composite material.

Figure 2:
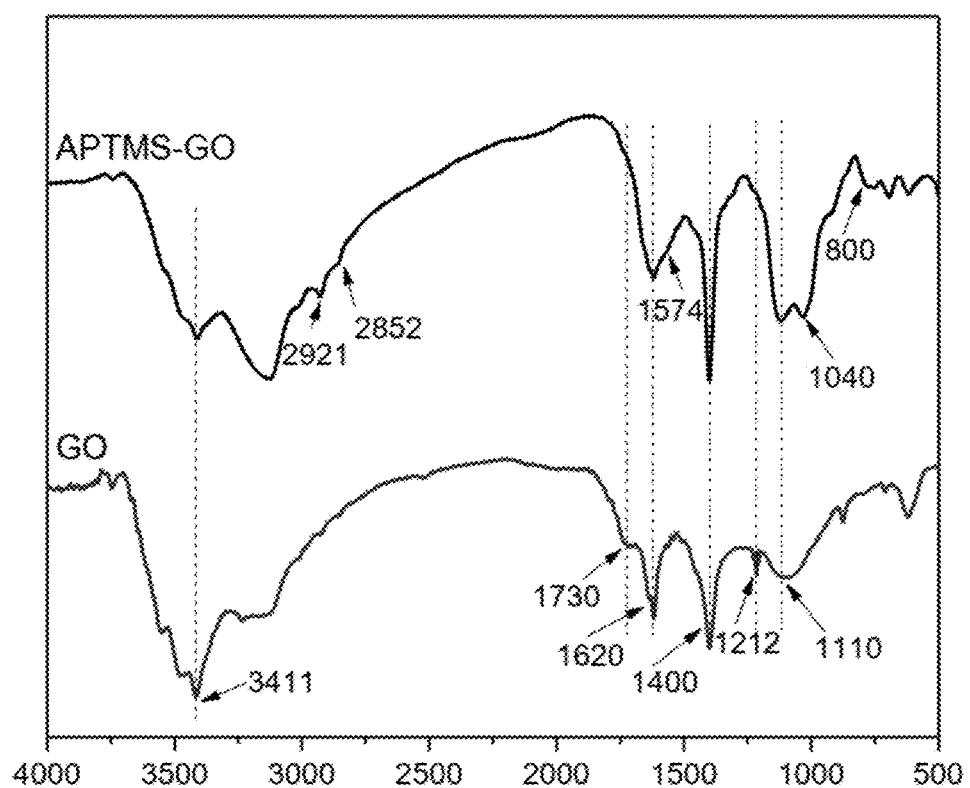
FIG. 2 is an infrared spectrogram of graphene oxide and functionalized graphene oxide.

FIG. 1 is a transmission electron microscope image of graphene oxide and functionalized graphene oxide, wherein the Image a is graphene oxide, and the Image b is functionalized graphene oxide. FIG. 2 is an infrared spectrogram of graphene oxide and functionalized graphene oxide, the abscissa is the wave number per centimeter, and the ordinate is the transmittance.

The modified rubber tooth block prepared in Example 2 and the modified nitrile rubber prepared in Comparative Examples 1-3 were tested as follows:

1. Tensile Strength: according to the test method specified in GB/T528-1998 "Determination of Tensile Stress-Strain Properties of Vulcanized Rubber or Thermoplastic Rubber", testing the elongation at break of the sample;

2. Shore Hardness: according to the test method specified in GB/T531.1-2008 "Test Method for Indentation Hardness of Vulcanized Rubber or Thermoplastic Rubber Part 1 Shore Durometer Method (Shore Hardness)", testing the Shore hardness of the sample;

3. Compression Set: according to the test method specified in GB/T7759-1996 "Determination of Compression Set of Vulcanized Rubber and Thermoplastic Rubber at Room Temperature, High Temperature and Low Temperature", testing the compression set of the sample at 100° C.;

The results are shown in table below.

| Test Results | Comparative Example 1 | Comparative Example 2 | Comparative Example 3 | Example 2 |
|---|---|---|---|---|
| Elongation at Break/% | 561.25 | 582.76 | 520 | 300 |
| Shore Hardness/A | 65.7 | 65 | 70 | 78 |
| Compression Set at 100° C./% | 50.2 | 71 | 15 | <30 |

As can be seen from the table, compared with the modified nitrile rubber prepared in Comparative Examples 1-3, the elongation at break of the functionalized graphene oxide modified nitrile rubber prepared in Example 2 of the present disclosure is lower, the Shore hardness is higher, and the compression set at 100° C. is smaller, indicating that the functionalized graphene oxide modified nitrile rubber prepared in the embodiment of the present disclosure has good mechanical properties, small compression set, and good applicability to high temperature environments.

Although the embodiments disclosed in the present disclosure are as described above, the described content is merely used to facilitate understanding of the present disclosure, and is not intended to limit the present disclosure. Any modifications and variations can be made by those skilled in the art without departing from the spirit and scope of the present disclosure, but the scope of the patent protection of the present disclosure should still be subject to the scope defined by the appended claims.

The invention claimed is:

1. A functionalized graphene oxide nitrile rubber, comprising the following components in parts by weight: 100-140 parts of nitrile rubber, 30-90 parts of functionalized graphene oxide nitrile rubber masterbatch, 1.8-2.52 parts of vulcanizing agent, 1.2-1.68 parts of vulcanization accelerator, 5-7 parts of vulcanization activator, 17-23.8 parts of plasticizer which is a mixture of stearic acid, dibutyl phthalate and tricresyl phosphate with a mass ratio of 1.5-2.5:8-12:4-6, 2-2.8 parts of antioxidant, 59-86.6 parts of filler, 0.1-0.14 part of curing agent and 2-2.8 parts of dichlorophenol, wherein a mass fraction of functionalized graphene oxide in the functionalized graphene oxide nitrile rubber masterbatch is 30-57%;

wherein, a preparation method of the functionalized graphene oxide nitrile rubber masterbatch comprises the following steps: dispersing the functionalized graphene oxide in a dispersant; ultrasonically dispersing for 60-90 minutes to obtain a functionalized graphene oxide dispersion; adding nitrile rubber latex and stirring for 90-120 min to obtain a mixed solution; adding the mixed solution above to a mixed liquid of a calcium chloride aqueous solution and ethanol with a volume ratio of 1:2-4 used as a coagulation solution for demulsification, wherein the volume ratio of the mixed solution to the coagulation solution is 2-3:3-5; after suction filtration, washing and drying, obtaining a functionalized graphene oxide nitrile rubber masterbatch;

wherein, the preparation method of the functionalized graphene oxide comprises the following steps: adding a graphene oxide and 3-Aminopropyltrimethoxysilane with a mass ratio of 1:2 into an anhydrous ethanol and ultrasonic stirring uniformly; heating to 70-80° C. in a water bath and refluxing for 4-6 hours; then adding distilled water to the mixture, centrifuging, washing and drying, obtaining Aminated Graphene.

2. A functionalized graphene oxide modified tooth-scar-free tooth block, made of the functionalized graphene oxide nitrile rubber according to claim 1, a preparation process comprising the following steps:
(1) weighing the components according to a formula of the functionalized graphene oxide nitrile rubber for later use;
(2) plasticating the nitrile rubber to obtain a plasticated rubber;
(3) sequentially adding dichlorophenol, a vulcanizing agent, a vulcanization activator, a plasticizer, an antioxidant and a filler into the plasticated rubber obtained in step (2), and uniformly mixing to obtain a premixed rubber compound;
(4) cooling the premixed rubber compound obtained in step (3), adding the functionalized graphene oxide nitrile rubber masterbatch and the curing agent, and uniformly mixing to obtain a mixed rubber compound;
(5) cooling the mixed rubber compound obtained in step (4), then adding the vulcanization accelerator, uniformly mixing and obtaining a mixed rubber sheet;
(6) blanking the mixed rubber sheet obtained in step (5) according to a size and a shape of a tooth block mold, wherein a pressing force of the mold in a vulcanization process is 25-27 MPa, a temperature is maintained at 175-180° C., and a pressing time is 5-6 h; after vulcanization, opening the mold and taking out the tooth block;
(7) after taking out the tooth block, trimming and shaping.

* * * * *